UNITED STATES PATENT OFFICE 2,568,572

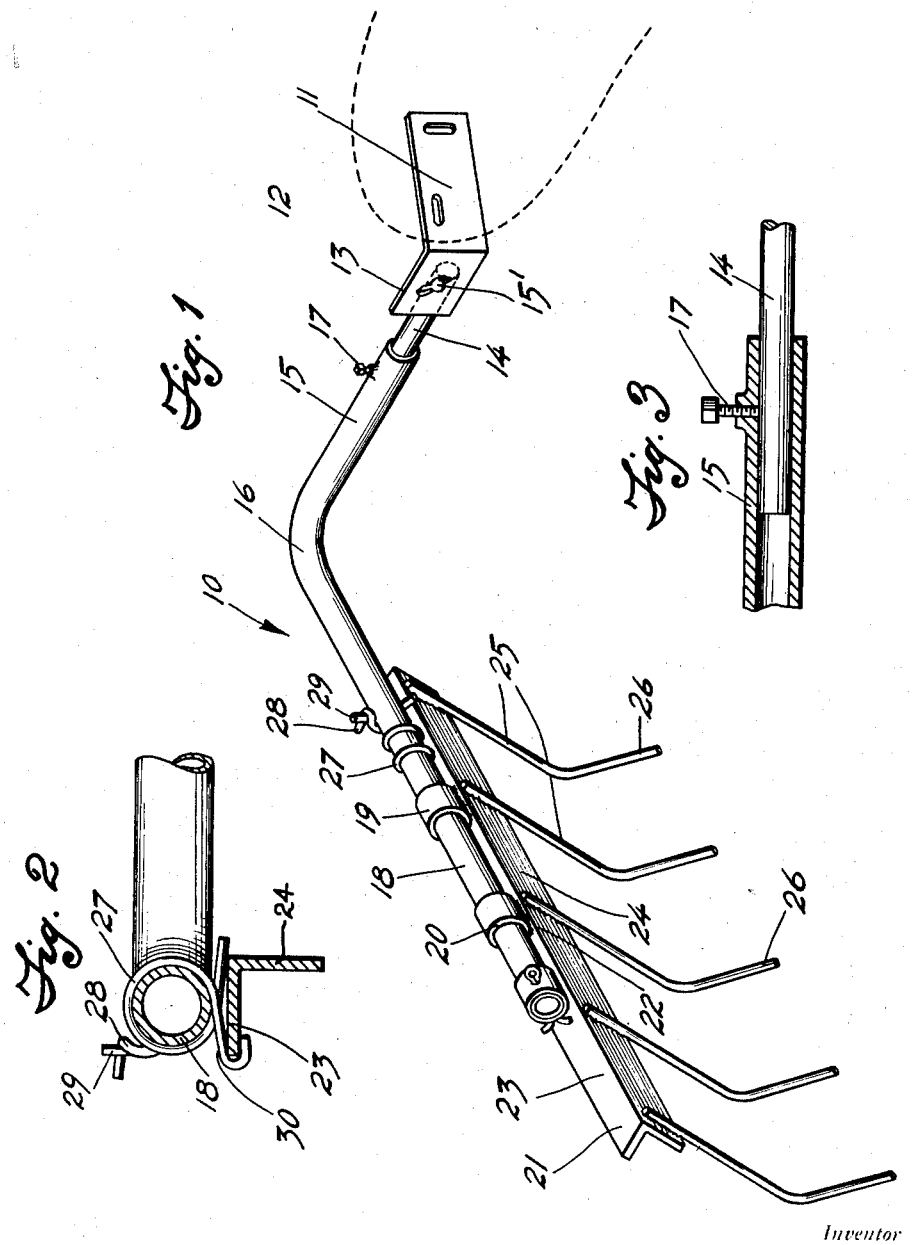

MULCHER ATTACHMENT FOR PLOWS

Harry Van Zee, Oskaloosa, Iowa

Application December 8, 1945, Serial No. 633,774

1 Claim. (Cl. 97—5)

My invention relates to agricultural implements and has for its object to provide means whereby newly turned ground may be harrowed and mulched with the turning thereof.

Another object of my invention is to provide means for the simultaneous plowing and tilling of the soil.

A further object of this invention is to provide a harrow attachment for the mold-board of a plow which may be vertically, horizontally, longitudinally and incliningly adjusted relative to the mold-board and which will act in concert therewith.

Other features and advantages will become more readily apparent from the following description and the accompanying illustrative drawings in which:

Figure 1 is a perspective view of my invention,
Figure 2 is a sectional detail view thereof, and
Figure 3 is another detail view.

In the accompanying drawings like reference characters indicate like parts throughout and in which 10, indicates my invention which includes a bracket 11, attachable to a plow mold-board 12, and to the end 13, of the said bracket a rod 14, is pivotally connected by a clamp screw 15'. The member 14, is telescopically connected to the arm 15, of a tube 16, and is adjustably held thereto by means of a set bolt 17. The arm 15, is provided with a longitudinal right-angular extension 18, upon which is pivotally connected by means of collars 19 and 20, an angle iron bar 21, which collars are welded as at 22, to the flange 23, of the bar 21. To the flange 24, of the said bar, which flange is substantially vertically disposed, is fixed a series of mulching teeth 25, the lower ends 26, of which are angularly disposed toward the plow or mold-board. The member 21, is horizontally adjustable upon the arm 18, through the slidable movement of the collars 19 and 20. Coiled around the arm 18, is a spring 27, one end 28, of which is secured to the pin 29, fixed to the arm 18, and the other end 30, of which is secured under the flange 23, as indicated in Figure 2, whereby the cultivator teeth will have sufficient resilient movement to jump obstacles.

From the foregoing it will be noted that I have provided a soil pulverizer which may be attached directly to a plow mold-board or other part thereof to directly follow and operate upon a turned furrow, whereby the mulching of the furrow is simultaneous with its turning, at which time the soil is always in far better condition for breaking and pulverizing than later. Furthermore, it will be seen that I have provided a device which may be adjusted horizontally relative to the plow, vertically relative thereto, and by means of the sliding movement of the member 23, the member may be adjusted longitudinally on the bar 18.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

The combination with a moldboard of an angle arm extending rearwardly and outwardly therefrom, the rearwardly extending portion of the arm being extensible, means including clamp means attaching said rearwardly extending portion of the arm to said moldboard, said clamp means providing for pivotal adjustment vertically of said arm about a transverse horizontal axis, and a plurality of teeth secured on said arm and extending downwardly and rearwardly to smooth and to mulch soil turned by said moldboard, a member longitudinally and rotatively shiftable on the outwardly extending portion of said arm and having said teeth rigidly secured thereon, and a spring secured to said arm and to said member to bias said member downwardly and forwardly, whereby said teeth are adjustable vertically, outwardly and inwardly and rotatably with reference to said outwardly extending portion.

HARRY VAN ZEE.

REFERENCES CITED

The following references are of record in the file of this patent:

UNITED STATES PATENTS

| Number | Name | Date |
|---|---|---|
| 292,272 | Wood | Jan. 22, 1884 |
| 350,085 | Steinbarger | Sept. 28, 1886 |
| 485,830 | Yoder | Nov. 8, 1892 |
| 938,839 | Flynn | Nov. 2, 1909 |
| 1,148,254 | Rawlings | July 27, 1915 |
| 1,171,178 | Demmer | Feb. 8, 1916 |
| 1,581,395 | Danskin | Apr. 20, 1926 |
| 1,615,679 | Bruning | Jan. 25, 1927 |
| 2,136,851 | Jess | Nov. 15, 1938 |